United States Patent
Jeong

(10) Patent No.: US 7,191,258 B2
(45) Date of Patent: Mar. 13, 2007

(54) PACKET FORWARDING SYSTEM HAVING A CONTROL PACKET PROCESSOR WHICH ALLOCATES THE BANDWIDTH FOR A CONTROL PACKET ADAPTIVELY AND PROCESSING METHOD THEREOF

(75) Inventor: Min-seop Jeong, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 578 days.

(21) Appl. No.: 10/769,775
(22) Filed: Feb. 3, 2004

(65) Prior Publication Data
US 2004/0174892 A1 Sep. 9, 2004

(30) Foreign Application Priority Data
Mar. 4, 2003 (KR) ...................... 10-2003-0013446

(51) Int. Cl.
*G06F 13/24* (2006.01)
*H04L 12/28* (2006.01)
(52) U.S. Cl. ............................. 710/22; 710/9; 710/52; 710/53; 710/110; 710/260; 710/268; 370/255; 370/412; 370/419; 370/422
(58) Field of Classification Search ..................... 710/9, 710/22, 52, 53, 110, 260, 286; 370/255, 370/412, 419, 422
See application file for complete search history.

(56) References Cited

U.S. PATENT DOCUMENTS

| 5,530,703 | A * | 6/1996 | Liu et al. ..................... 370/255 |
| 6,295,573 | B1 * | 9/2001 | Bailey et al. ............... 710/260 |
| 6,570,884 | B1 * | 5/2003 | Connery et al. ............ 370/419 |

* cited by examiner

*Primary Examiner*—Tammara Peyton
(74) *Attorney, Agent, or Firm*—Sughrue Mion, PLLC

(57) ABSTRACT

A control packet management device of a packet forwarding system has a packet queue having a plurality of queues to store a control packet as transmitted, a first processor to transmit said control packet stored in one queue of said plurality of queues to a host a by one-to-one interrupt, a second processor to divide said control packets stored in said one queue into groups of a predetermined size and transmit said control packets to said host in the group unit and by direct memory access (DMA), a third processor to discard a most common type of said control packets stored in said one queue, and a controller to control said first, second and third processors to selectively operate in accordance with an accumulation state of said control packets stored in said plurality of queues.

20 Claims, 4 Drawing Sheets

PACKET FORWARDING SYSTEM HAVING A CONTROL PACKET PROCESSOR WHICH ALLOCATES THE BANDWIDTH FOR A CONTROL PACKET ADAPTIVELY AND PROCESSING METHOD THEREOF

CROSS-REFERENCE TO RELATED APPLICATIONS

This application claims the priority of Korean Patent Application No. 2003-13446, filed Mar. 4, 2003 in the Korean Intellectual Property Office, the disclosure of which is incorporated herein by reference.

BACKGROUND

1. Field of the Invention

The present invention relates to a packet forwarding system used in a network system, and more particularly to a packet forwarding system capable of controlling, among the forwarded packets, a control packet (or control traffic) for the purpose of network control and efficiency; the present invention also relates to a control packet controlling apparatus and a control packet processing method thereof.

2. Description of the Related Art

Generally, a router and a switch are representative examples of the devices that connect networks. The main function of the router or the switch is to transmit the data packet to a destination. In order to ensure that the data packets are transmitted to the right destination, a control packet management device has to be provided in order to have a control packet, which controls the network, be transmitted to a host for processing.

FIG. 1 is a schematic block diagram of a conventional control packet management device 110. As shown, the control packet management device 110 is provided with a host 120 which processes a control packet received from the control packet management device 110.

The control packet management device 110 has a queue 111 to temporarily store a control packet as inputted, and a control unit 113 to transmit the control packet stored in the queue 111 to a host 120 by the interrupt method.

As the control packet is inputted, the control packets are temporarily stored in the queue 111, and the control unit 113 transmits such temporarily-stored control packets to the host 120 by the interrupt method, i.e., the control unit 113 transmits such temporarily-stored control packets to the host 120 as soon as the control packet is received. More specifically, the control unit 113 checks the queue 111 to determine whether there is any control packet to be transmitted, and if so, sends out an interrupt signal to a CPU 121 of the host 120, notifying that there is a control packet to be transmitted for processing. At this time, the CPU 121 temporarily stops the current operation, activates the interrupt service routine, and records the control packet existing in the queue 111 with a register 123 to record the existing control packet in the register 123. The CPU 121 reads the control packets recorded in the register 123 and thus processes the read control packets.

As described above, the conventional control packet management device 110 uses a so-called 'one-by-one interrupt', by which an input control packet is read and directly transmitted to the host 120 one by one. Such 'one-by-one interrupt' requires a somewhat long period of time for the process of transmitting the input control packet to the host 120. Accordingly, when there is temporarily a great amount of traffic of control packets to be transmitted to the host 120, performance of the host 120 degrades and in the worse case, the host 120 can be shutdown.

SUMMARY

Accordingly, it is an object of the present invention to provide a packet forwarding system capable of controlling a control packet efficiently even when the traffic of control packets to a host becomes temporarily heavy, and a control packet management device and a control packet management method thereof.

In order to achieve the above object and/or other features and aspects of the present invention, there is provided a control packet management device of a packet forwarding system, which includes a packet queue having a plurality of queues to store a control packet as transmitted, a first processor to transmit said control packet stored in one queue of said plurality of queues to a host by a one-by-one interrupt, a second processor to divide said control packets stored in said one queue into groups of a predetermined size and transmits said control packets to said host in the group unit and by direct memory access (DMA), a third processor to discard a most common type of said control packets stored in the one queue, and a controller to control the first, second and third processors to selectively operate in accordance with an accumulation state of the control packets stored in said plurality of queues. The controller stores the rest of the control packets other than the discarded control packets to another queue of the plurality of queues.

The controller controls the first, second and third processors to selectively operate adaptively in accordance with the accumulation state of the rest of the control packets stored to another queue.

The packet queues have a predetermined threshold, and the controller determines the accumulation state of the packet queues with reference to the threshold, and controls the first, second and third processors to selectively operate in accordance with the accumulation state of said packet queues.

The controller controls the first processor such that, when the accumulation state of the control packets in the one queue is lower than a first threshold, the first processor transmits the control packets stored in the one queue to the host by the one-to-one interrupt. The controller controls the second processor such that, when the accumulation state of the control packets in the one queue equals to, or is greater than a first threshold, the second processor divides the control packets of the one queue into groups and transmits the control packets to the host in the group unit and by direct memory access (DMA). The controller controls the third processor such that, when the accumulation state of the control packets in the one queue is equal to, or is greater than a second threshold, the third processor discards a first type control packet which is most common among said control packets, and controls said packet queues such that the rest of the control packets other than the first type of control packet are stored to a second packet queue.

The controller controls said first processor such that, when the accumulation state of the control packets in the second queue is lower than a third threshold, the first processor transmits the control packets stored in the second queue to the host by the one-to-one interrupt. The controller controls the second processor such that, when the accumulation state of the control packets in the second queue equals to, or is greater than a third threshold, the second processor divides the control packets of the second queue into groups and transmits the control packets to the host in the group unit and by direct memory access (DMA). The controller controls the third processor such that, when the accumulation state of the control packets in the second queue is equal to, or is greater than a fourth threshold, the third processor discards a second type of control packet which is most common among the control packets stored in the second queue, and controls the packet queues such that the rest of the control packets other than the second type of control packet is stored to yet another packet queue (third queue).

In the absence of the third packet queue in the packet queues, the controller controls the third processor such that, when the accumulation state of the control packets in the third queue is equal to, or greater than the fourth threshold, the third processor blocks the rest of the control packets other than the second type of control packet from being stored to the second queue.

Meanwhile, according to the present invention, a method for controlling a control packet in a packet forwarding system includes a first storing step of storing a control packet as transmitted to one queue of a plurality of queues, a first processing step of transmitting the stored control packets of the one queue to a host by a one-by-one interrupt, a second processing step of dividing the control packets of the one queue into groups of a predetermined size, and transmitting the control packets in group unit to the host by direct memory access (DMA), third processing step of discarding the most common types of control packets among the stored control packets of the one queue, and a second storing step of storing the control packets other than the most common type in a second queue among the plurality of queues. The first, second and third processing steps are operated selectively in accordance with an accumulation state of the control packets stored in the one queue.

The first, second and third processing steps are operated selectively in accordance with the accumulation state of the control packets which are different from the most common type and are stored in the second queue.

The first processing step transmits the stored control packets of the one queue to the host by a one-to-one interrupt when the accumulation state of the control packets in the one queue is lower than a first threshold. When the accumulation state of the control packets in the one queue equals to, or is greater than a first threshold, the second processing step divides the stored control packets of the one queue into groups of a predetermined size and transmits the control packets in a group unit to the host by direct memory access (DMA). When the accumulation state of the control packets of the one queue equals to, or is greater than a second threshold, the third processing step discards a most common type of control packet among the stored control packets of the one queue, and the second storing step stores the control packets other than the most common type to a second queue of the plurality of queues.

According to the present invention, first, delay in packet transmission can be minimized by transmitting the control packets to the host by a one-by-one interrupt when the queue that temporarily stores the control packets is not overpopulated.

Secondly, the system according to the present invention can adaptively deal with a sudden traffic surge of the control packets, by allocating a high bandwidth in times of temporary overpopulation of control packets in the queue and by subsequently enhancing the speed of the control packets being processed at the host. As a result, the performance of the system is stabilized and improved.

BRIEF DESCRIPTION OF THE DRAWINGS

The above objects and other features of the present invention will become more apparent by describing in detail a preferred embodiment thereof with reference to the attached drawings, in which.

DETAILED DESCRIPTION OF THE PREFERRED EMBODIMENT

Hereinafter, the present invention will be described in detail with reference to the accompanying drawings.

Figure 1:
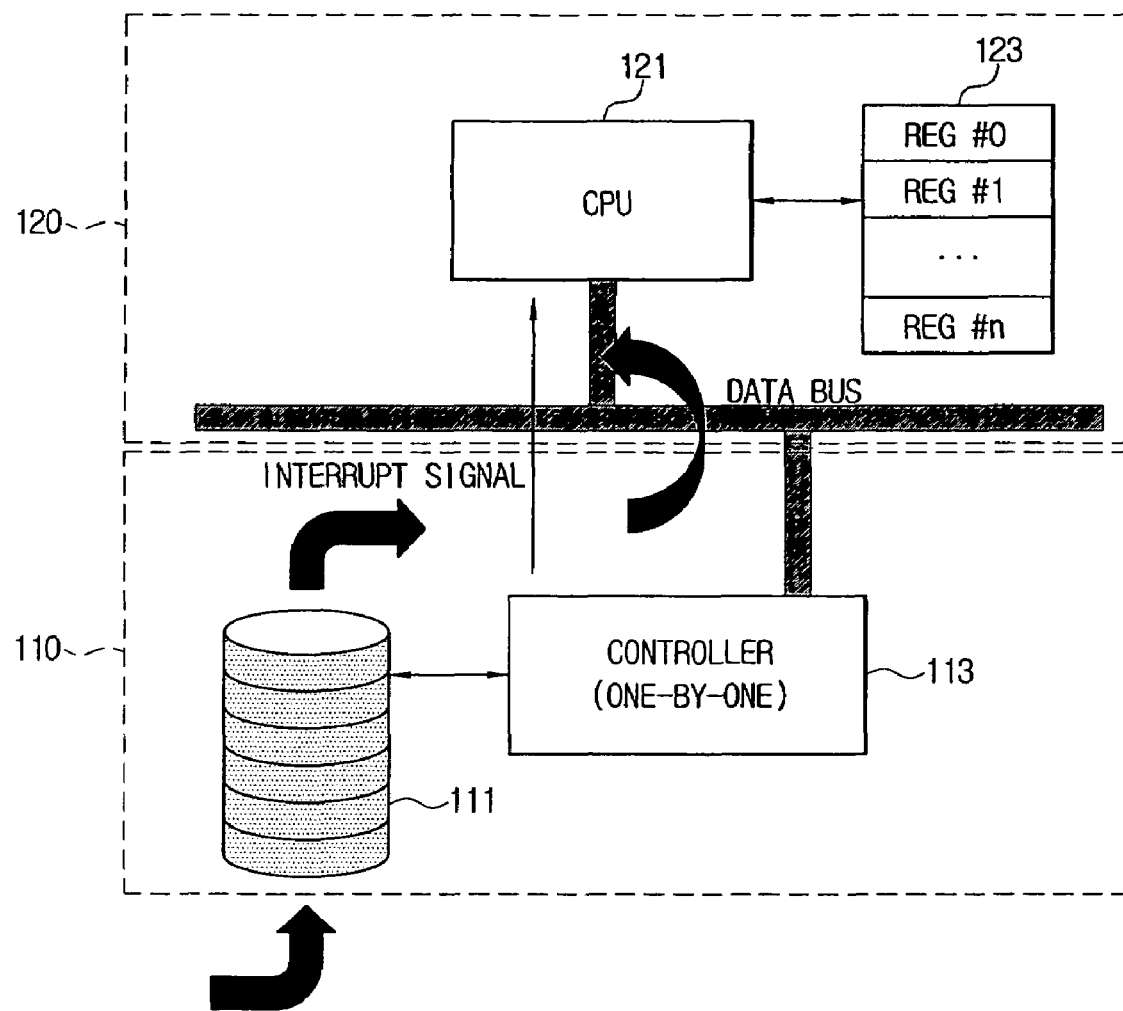
FIG. 1 is a schematic block diagram of a control packet management device of a conventional packet forwarding system.
Figure 2:
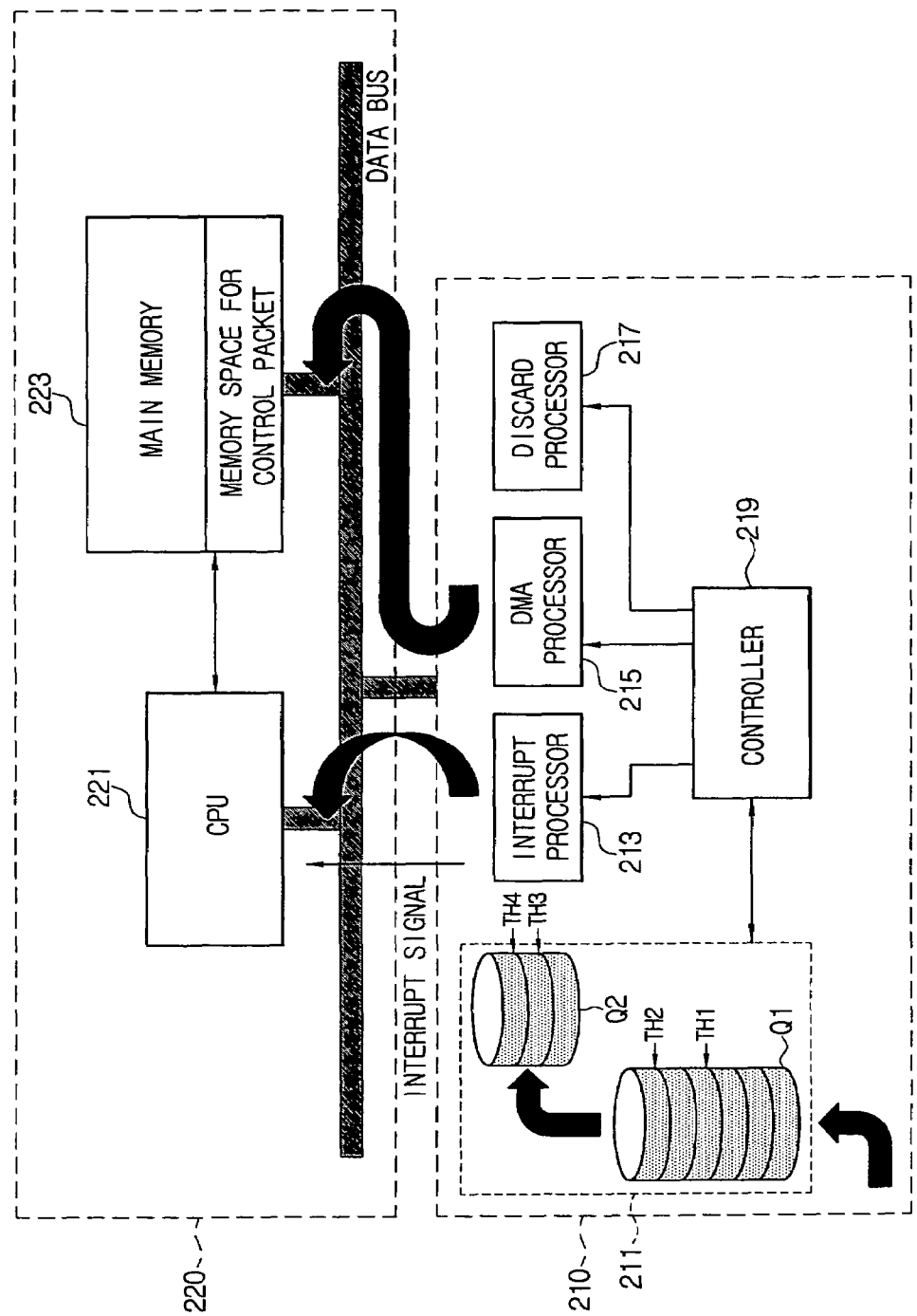
FIG. 2 is a schematic block diagram of a control packet management device of a packet forwarding system according to a preferred embodiment of the present invention.

FIG. 2 is a schematic block diagram showing a control packet management device 210 according to a preferred embodiment of the present invention. Referring to FIG. 2, a reference numeral 220 denotes a host for processing a control packet transmitted from the control packet management device 210.

The control packet management device 210 includes a packet queue 211, an interrupt processor 213, a direct memory access (DMA) processor 215, a discard processor 217 and a controller 219.

The packet queue 211 has at least two queues Q1, Q2, . . . , and stores therein a control packet transmitted to the control packet management device 210.

The interrupt processor 213 transmits the stored control packets to a CPU 221 of the host 220 by a one-by-one interrupt when the control packets stored in the packet queue 211 exceeds a predetermined first threshold. Accordingly, the CPU 221 activates the ISR and processes the transmitted control packets.

The DMA processor 215 divides the control packets into groups and records the control packets in a main memory 223 of the host 220 in the group unit and in the direct memory access (DMA) when the control packets stored in the packet queue 211 exceeds the first threshold.

The discard processor 217 discards the most common packet type of packet among the control packets temporarily stored in the packet queue 211 when the control packets stored in the packet queue 211 exceed a predetermined second threshold.

The controller 219 monitors the packet accumulation state in the packet queue 211, and controls the packet queue 211 such that the control packets are adaptively transmitted to the host 220 according to the packet accumulation state of the packet queue 211. That is, according to the packet accumulation state, the transmission of the control packets is adaptively selected among a one-by-one interrupt, DMA, and control packet discard.

Figure 3:
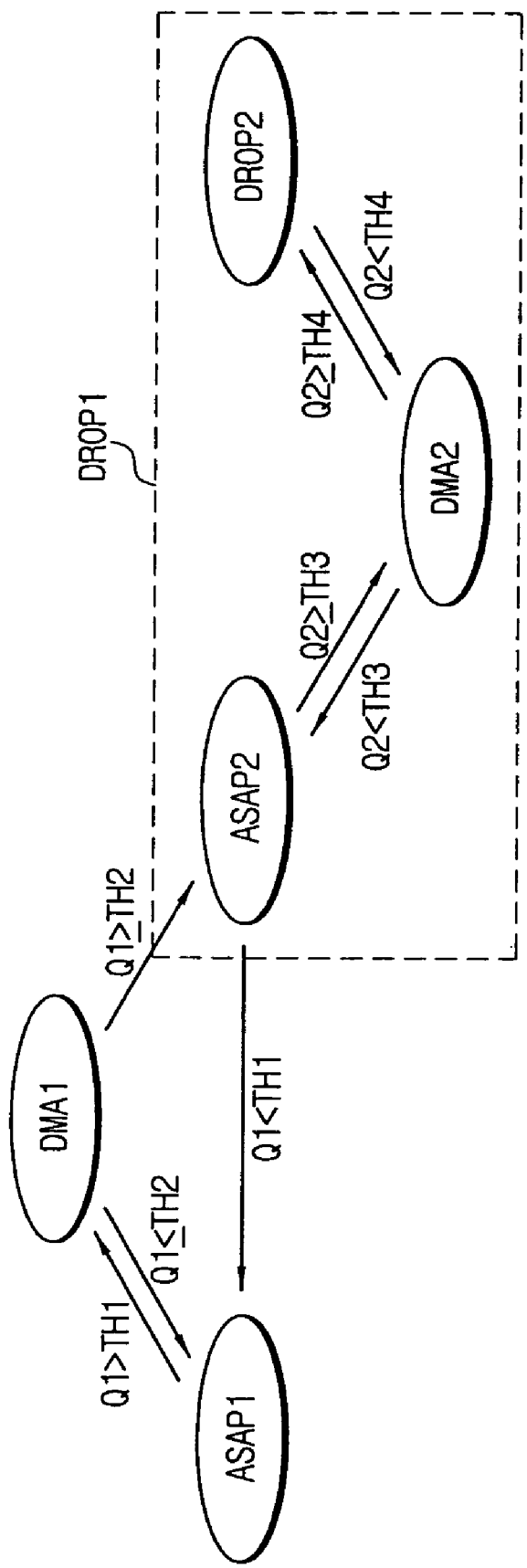
FIG. 3 is a diagram for illustrating the operation of the control packet management device of FIG. 2.
Figure 4:
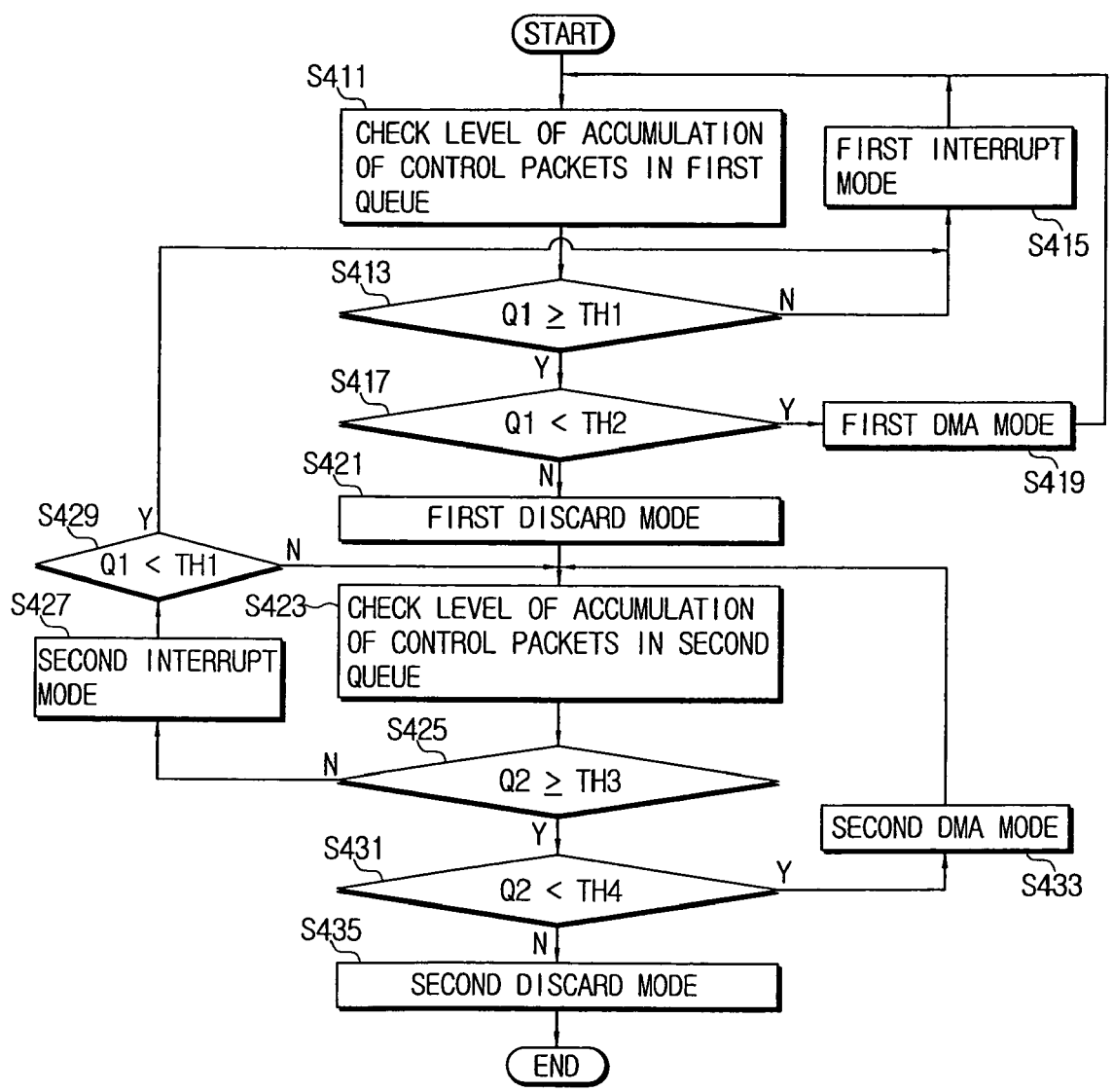
FIG. 4 is a flowchart illustrating a method for controlling a control packet in the control packet management device of FIG. 2.

FIG. 3 is a diagram illustrating the process in which the transmission path of the control packets is adaptively altered to the host 220. FIG. 4 is a flowchart for showing the operation of the control packet management device. Referring to FIGS. 3 and 4, the process of transmitting the control packets from the control packet management device 210 to the host 220 according to the present invention will be described below in greater detail.

The controller 219 checks the packet accumulation state of a first queue Q1 of the packet queue 211 (S411). Then the controller 219 determines the packet accumulation state of the first queue Q1 based on a predetermined first threshold TH1. If the packet accumulation state of the first queue Q1 is lower than the first threshold TH1 (S413), i.e., Q1<TH1, the controller 219 recognizes that the first queue Q1 is not overpopulated, and switches the operation mode to a first interrupt mode (ASAP1; as soon as possible), and transmits the control packets to the host 220 (S415).

Meanwhile, if the packet accumulation state of the first queue Q1 is determined to have reached or exceeded the first threshold TH1, i.e., if Q1≧TH1 as a result of checking (S413) and if the first queue Q1 is determined to be less then a second threshold TH2, the controller 219 recognizes that the traffic of control packets is increasing, and thus switches to the first DMA mode (DMA1) and transmits the control packets to the host 220 in the First DMA mode (DMA1) (S419).

More specifically, the DMA processor 215 divides the control packets accumulated in the first queue Q1 into groups of certain size, and records the control packets in a group unit in the main memory 223 of the host 220 by the DMA (direct memory access method). At this time, the controller 219 requests the CPU 221 for a predetermined area of main memory 223 for operating the DMA processor 215, and accordingly, the CPU 221 sets a predetermined area in the main memory 223 for the DMA. Accordingly, the DMA processor 215 can access the control packets directly at the preset area of the main memory 223 in the group unit, and as a result, a data bus can be performed efficiently.

While operating in the first DMA mode (DMA1), the controller 219 checks the packet accumulation at the first queue Q1. If the packet accumulation state of the first queue Q1 is lower than the first threshold TH1, i.e., when Q1<TH1, the controller 219 switches back to the first interrupt mode (ASAP1), and transmits the control packets by a one-by-one interrupt.

However, if the control packets keep accumulating in the first queue Q1, and thus exceed or equal the second threshold TH2, i.e., Q1≧TH2 (S417), the controller 219 recognizes it as the traffic jam of control packets and switches to the first discard mode (DROP1) (S421).

Accordingly, the discard processor 217 discards the most common type (hereinafter called 'first type') of control packets in the temporarily increasing traffic of the control packets. Generally, such a temporary traffic surge of control packets are mainly due to excessive generation of one type of control packets.

Accordingly, the controller 219 discards the first type of control packets from the first queue Q1, and stores the other types of control packets in the second queue Q2.

After that, the controller 219 checks the packet accumulation state of the second queue Q2 (S423), and adaptively operates in the mode among the three operation modes, i.e., the second ASAP mode (ASAP2), the second DMA mode (DMA2) and the second discard mode (DROP2), according to the packet accumulation state of the second queue Q2. This will be described below in greater detail.

The controller 219 checks the packet accumulation state of the second queue Q2. If the packet accumulation state is lower than a third threshold (TH3), i.e., when Q2<TH3 (S425), the controller 219 transmits the control packets of the second queue Q2 to the host 220 in the second interrupt mode (ASAP2) (S427). The controller 219 checks the packet accumulation state of the first queue Q1 as well as the second queue Q2.

Accordingly, if the packet accumulation state of the first queue Q1 drops to be lower than the first threshold TH1 due to traffic reduction (S429), the controller 219 releases from the first discard mode (DROP1). Accordingly, the controller 219 transmits the controls packets of the second queue Q2 to the host 220 in the second interrupt mode (ASAP2), and switches to the first interrupt mode (ASAP1) in which the controller 219 transmits the control packets of the first queue Q1 to the host 220 in the first interrupt mode (ASAP1) (S415).

If it is determined as otherwise, i.e., if the traffic keeps increasing in the second queue Q2 to reach or exceed the third threshold TH3, i.e., if Q2≧TH3 (S425) and the second queue Q2 is less than a fourth threshold TH4, the controller 219 operates the DMA processor 215 to switch its operation mode to the second DMA mode (DMA2) (S433). Then as described above, a predetermined area of the main memory 223 of the host 220 is allocated, and the control packets of the second queue Q2 are directly recorded in the allocated area of the main memory 223 in the group unit.

As indicated above, while operating in the second DMA mode (DMA2), the controller 219 checks the packet accumulation state of the second queue Q2, and if the packet packet accumulation state of the second queue Q2 becomes lower than the third threshold TH3, i.e., Q2<TH3, the controller 219 switches back to the second interrupt mode (ASAP2).

If it is otherwise, i.e., if the accumulation of the control packets at the second queue Q2 keeps increasing to reach or exceed a fourth threshold TH4, i.e., Q2≧TH4 (S431), the controller 219 recognizes the traffic to be considerably heavy, and thus switches to the second discard mode (DROP2) (S435).

In the second discard mode (DROP2), the rest of the types of the control packets, i.e., the control packets remaining after discard of the most common control packets in first discard mode (DROP1), are blocked from being stored in the second queue Q2. In other words, the controller 219 controls the discard processor 217 to discard the rest of the types of the control packets remaining after the filtering of the first type of control packets.

Accordingly, in the second discard mode (DROP2), no more control packets are accumulated in the second queue Q2, while only the previously-accumulated control packets are controlled based on the third and the fourth thresholds TH3, TH4, in the mode sequentially changing from the DMA2 to the ASAP2.

Accordingly, as the operation mode changes to the second interrupt mode (ASAP1), the controller 219, as described above, checks the packet accumulation state of the first queue Q1. If the packet accumulation state becomes lower than the first threshold TH1, the controller 219 switches from the first discard mode (DROP2) back to the first interrupt mode (ASAP1) so that the control packets of the first queue Q1 are transmitted to the host 220 by the one-by-one interrupt.

Although the present invention has been described above with reference to one embodiment that has two packet queues, i.e., first and second queues Q1, Q2 for the packet queue 211 as shown in FIG. 2, it is of course possible that the packet queue 211 has two or more queues Q1, Q2, . . . , Qn.

For one instance, the packet queue 211 may have first, second and third queues Q1, Q2, Q3, and in this case, the second queue Q stores the remaining control packets after the removal of the first type, i.e., the most common type of control packets, and the third queue Q3 stores the remaining control packets after the removal of the second type, i.e., the second most common type of control packets.

Accordingly, the second discard mode (DROP2) includes the third interrupt mode (ASAP3), the third DMA mode (DMA3) and the third discard mode (DROP3).

The controller 219 switches the operation mode among the third interrupt mode (ASAP3), the third DMA mode (DMA3) and the third discard mode (DROP3) in accordance with the packet accumulation state stored in the third queue Q3 after the removal of the second most common type of control packets. When the operation mode switches to the third discard mode (DROP3), the control packets, which remained after the removal of the second type of control packets by the second discard mode (DROP2), are blocked from being stored in the third queue Q3.

Also, as described above, while operating in the ASAP3, the controller 219 checks the accumulating level of the control packets of the first queue Q1, and when the accumulated level of the control packets is lower than the first threshold TH1, the operation mode changes from the DROP2 back to the ASAP1.

In the embodiment described above, the packet accumulation state of the first queue Q1 is checked during the ASAP2 and ASAP3, and with the packet accumulation state being lower than the first threshold TH1, i.e., Q1<TH1, the DROP1 and DROP2 are released and mode is switched to the ASAP1. However, it is only by way of example, and should not be considered as limiting. For example, it can be designed such that the DROP1 and DROP2 can be released and switched to the DMA2 on the condition that the packet accumulation state of the first queue Q1 is lower than the second threshold TH2 (Q1<TH2).

Accordingly, the overall performance of the system can be improved by allocating a bandwidth in an adaptive manner.

According to the present invention, first, delay in packet transmission can be minimized by transmitting the control packets to the host by a one-to-one interrupt when the queue that temporarily stores the control packets is not overpopulated.

Secondly, the system according to the present invention can adaptively deal with a sudden traffic surge of the control packets, by allocating a high bandwidth in times of temporary overpopulation of control packets in the queue and by subsequently enhancing the speed of the control packets being processed at the host. As a result, the performance of the system is stabilized and improved.

Although a few preferred embodiments of the present invention has been described, it will be understood by those skilled in the art that the present invention should not be limited to the described preferred embodiments, but various changes and modifications can be made within the spirit and scope of the present invention as defined by the appended claims.

What is claimed is:

1. A control packet management device of a packet forwarding system, comprising:
   a packet queue having a plurality of queues to store control packets as transmitted;
   a first processor to transmit at least one of said control packets stored in one queue of said plurality of queues to a host by a one-to-one interrupt;
   a second processor to divide said at least one of said control packets stored in said one queue into groups of a predetermined size and transmit said at least one of said control packets to said host in a group unit and by direct memory access (DMA);
   a third processor to discard a most common type of said at least one of said control packets stored in said one queue; and
   a controller to control said first, second and third processors to selectively operate in accordance with an accumulation state of said control packets stored in said plurality of queues, wherein
   said controller stores the rest of said control packets other than the discarded control packets to another queue of said plurality of queues.

2. The control packet management device of claim 1, wherein said controller controls said first, second and third processors to selectively operate adaptively in accordance with an accumulation state of the rest of said control packets stored to said another queue.

3. The control packet management device of claim 1, wherein said plurality of queues have a predetermined threshold, and
   said controller determines an accumulation state of said plurality of queues with reference to said predetermined threshold, and controls said first, second and third processors to selectively operate in accordance with said accumulation state of said plurality of queues.

4. The control packet management device of claim 1, wherein said controller controls said first processor such that, when an accumulation state of said at least one of said control packets in said one queue is lower than a first threshold, said first processor transmits said at least one of said control packets stored in said one queue to said host by the one-to-one interrupt.

5. The control packet management device of claim 1, wherein said controller controls said second processor such that, when an accumulation state of said at least one of said control packets in said one queue equals to, or greater than a first threshold, said second processor divides said at least one of said control packets of said one queue into groups and transmits said at least one of said control packets to said host in a group unit and by direct memory access (DMA).

6. The control packet management device of claim 1, wherein said controller controls said third processor such that, when an accumulation state of said at least one of said control packets in said one queue is equal to, or greater than a second threshold, said third processor discards a first type of control packet which is most common among said control packets, and
   controls said plurality of queues such that the rest of the control packets other than said first type of control packet are stored to a packet queue different from that of said first type of control packet.

7. The control packet management device of claim 2, wherein said controller controls said first processor such that, when said accumulation state of rest of said control packets in said another queue is lower than a third threshold, said first processor transmits said rest of said control packets stored in said another queue to said host by the one-to-one interrupt.

8. The control packet management device of claim 2, wherein said controller controls said second processor such that, when said accumulation state of said rest of said control packets in said another queue equals to, or is greater than a third threshold, said second processor divides said rest of said control packets of said another queue into groups and transmits said rest of said control packets to said host in a group unit and by direct memory access (DMA).

9. The control packet management device of claim 2, wherein said controller controls said third processor such that, when said accumulation state of said rest of said control packets in said another queue is equal to, or greater than a fourth threshold, said third processor discards a second type of control packet which is most common among said rest of said control packets stored in said another queue, and controls said plurality of queues such that a second rest of said control packets other than said second type of control packet are stored to yet another packet queue.

10. The control packet management device of claim 9, wherein, in an absence of said yet another packet queue amongst said plurality of queues, said controller controls said third processor such that, when said accumulation state of said rest of said control packets in said another queue is equal to, or greater than said fourth threshold, said third processor blocks the second rest of said control packets other than said second type of control packet from being stored to said another queue.

11. A method for controlling a control packet in a packet forwarding system, comprising:

(a) storing control packets, as transmitted, to one queue of a plurality of queues;
(b) transmitting said stored control packets of said one queue to a host by one-to-one interrupt;
(c) dividing said control packets of said one queue into groups of a predetermined size, and transmitting said control packets in a group unit to said host by direct memory access (DMA);
(d) discarding a most common type of control packet among said stored control packets of said one queue; and
(e) storing control packets other than the most common type in another queue of said plurality of queues, wherein
said (b), (c), (d) steps are operated selectively in accordance with an accumulation state of said control packets stored in said one queue.

12. The control packet controlling method of claim 11, wherein said (b), (c), and (d) steps are operated selectively in accordance with an accumulation state of said control packets other than the most common type, which are stored in said another queue.

13. The control packet controlling method of claim 11, wherein said plurality of queues have a preset threshold, and an accumulation state of said control packets of said plurality of queues is determined based on said preset threshold.

14. The control packet controlling method of claim 11, wherein said step (b) comprises a sub-step of transmitting said stored control packets of said one queue to said host by a one-to-one interrupt when said accumulation state of said control packets in said one queue is lower than a first threshold.

15. The control packet controlling method of claim 11, wherein, when said accumulation state of said control packets in said one queue equals to, or is greater than a first threshold, said step (c) comprises a sub-step of dividing said stored control packets of said one queue into groups of a predetermined size and transmitting said control packets in a group unit to said host by direct memory access (DMA).

16. The control packet controlling method of claim 11, wherein, when said accumulation state of said control packets of said one queue equals to, or is greater than a second threshold, said step (d) comprises discarding a most common type of control packet among said stored control packets of said one queue, and said step (e) comprises storing control packets other than the most common type to another queue of said plurality of queues.

17. The control packet controlling method of claim 12, wherein, when said accumulation state of said control packets other than the most common type in said another queue is lower than a third threshold, said step (b) comprises transmitting said stored control packets of said another queue to said host by a one-by-one interrupt.

18. The control packet controlling method of claim 12, wherein, when said accumulation state of said control packets other than the most common type of said another queue equals to, or is greater than a third threshold, said step (c) comprises dividing said stored control packets other than the most common type of said another queue into groups of a predetermined size and transmitting said control packets other than the most common type in a group unit to said host by direct memory access.

19. The control packet controlling method of claim 12, wherein, when said accumulation state of said control packets other than the most common type of said another queue equals to, or is greater than a fourth threshold, said step (d) comprises discarding a second type of control packet which is a most common type among said control packets stored in said another queue and said method further comprises a step (f) storing said control packets other than said second type of control packets to yet another queue of said plurality of queues.

20. The control packet controlling method of claim 19, wherein, in an absence of said yet another queue in said plurality of queues, and when said accumulation state of said control packets other than the most common type in said another queue equals to, or is greater than said fourth threshold, said method further comprises blocking said control packets other than most common type from being stored to said another queue.

* * * * *